Patented Nov. 25, 1952

2,619,507

UNITED STATES PATENT OFFICE 2,619,507

DI(METHANESULFONYL) PEROXIDE AND ITS PREPARATION

Giffin D. Jones, Sanford, and Ralph E. Friedrich, Midland, Mich., assignors to The Dow Chemical Company, Midland, Mich., a corporation of Delaware No Drawing. Application January 5, 1951, Serial No. 204,696

1 Claim. (Cl. 260—607)

This invention relates to the new compound, di-(methanesulfonyl) peroxide, and to a method whereby it may be made.

According to the present invention, di(methanesulfonyl) peroxide, $CH_3SO_2-O-O-SO_2CH_3$, is prepared by the electrolysis of methanesulfonic acid, $CH_3SO_2OH$ in water. The new compound is a more active catalyst for the polymerization of vinylidene chloride at low temperatures than other peroxides heretofore employed for that purpose.

In a specific example, a direct current, at a current density of 0.2 ampere per square centimeter, was passed between shiny platinum electrodes immersed in 40 milliliters of a 10.2 normal solution of methanesulfonic acid in water at 11° C. In the course of 7 hours, there was deposited on the anode 1.06 grams of a water-insoluble white powder, which was recovered, washed with water, and dried at low temperature. Electrolysis of methanesulfonic acid does not proceed satisfactorily when the latter is anhydrous, nor when its water solutions are too dilute. The solution should preferably be over 5 normal, and solutions having a normality of 8 to 13 are preferred.

The new peroxide compound melts at 77° C., and decomposes when heated to 85° C. It appears to be insensitive to shock, as attempts to detonate it by impact have been unsuccessful. Titration with potassium iodide shows the freshly prepared material to contain 8.1 per cent available oxygen, which is 96 per cent of the theoretical amount for di(methanesulfonyl) peroxide. In solution in organic solvents, such as benzene, or monomeric vinylidene chloride, at a temperature of 25° C., the compound loses oxygen at an initial rate of 10 per cent of the amount available, per hour. However, if stored in the dry state, it is stable and retains its activity indefinitely.

Monomeric vinylidene chloride was sealed under vacuum in glass ampoules with 0.0066 mole per cent of di(methanesulfonyl) peroxide. The same concentration of 2,4-dichlorobenzoyl peroxide in vinylidene chloride was prepared, and this solution was sealed in glass ampoules. The samples were kept at 25° C. for 3 hours, the ampoules were opened and the polyvinylidene chloride was recovered and dried. The polymerization rate was found to be 2.55 per cent per hour, using di-(methanesulfonyl) peroxide, and 1.80 per cent per hour using 2,4-dichlorobenzoyl peroxide. The latter compound was among the most active catalysts previously employed in vinylidene chloride polymerizations.

Similar comparisons were made between the di(methanesulfonyl) peroxide and benzoyl peroxide, in the catalysis of vinylidene chloride polymerization. The relative polymerization rates at various polymerization temperatures are given in the following table.

| Catalyst | Concentration, moles, per liter of monomer | Polymerization rate, per cent per hour, at— | | |
|---|---|---|---|---|
| | | 25° C. | 35° C. | 45° C. |
| None | | 0.035 | 0.14 | 0.2 |
| Benzoyl peroxide | 0.005 | .15 | .25 | .8 |
| Di(methanesulfonyl) peroxide | .0001 | 0.5 | 1.2 | 2.1 |
| Do | .001 | 2.3 | 6.0 | 9.0 |
| Do | .01 | 5.0 | 9.5 | 17. |

Similar advantages have been shown for the new peroxide in the polymerization of vinyl chloride, and of vinyl chloride-vinylidene chloride copolymers in aqueous dispersions of the respective monomers.

We claim:

Di(methanesulfonyl) peroxide, a white solid, soluble in benzene, insoluble in water, and melting at 77° C.

GIFFIN D. JONES.
RALPH E. FRIEDRICH.

REFERENCES CITED

The following references are of record in the file of this patent:

UNITED STATES PATENTS

| Number | Name | Date |
|---|---|---|
| 2,222,155 | Pasternack et al. | Nov. 19, 1940 |
| 2,400,041 | Dickey | May 7, 1946 |
| 2,403,771 | Vaughan et al. | July 9, 1946 |
| 2,516,649 | Rust et al. | July 25, 1950 |
| 2,521,147 | Brown | Sept. 5, 1950 |